(12) United States Patent
Choi

(10) Patent No.: US 10,129,534 B2
(45) Date of Patent: Nov. 13, 2018

(54) TRANSPARENT LED DISPLAY DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/649,030

(22) Filed: Jul. 13, 2017

(65) Prior Publication Data
US 2018/0020210 A1    Jan. 18, 2018

(30) Foreign Application Priority Data

Jul. 18, 2016 (KR) ........................ 10-2016-0090619

(51) Int. Cl.
*H04N 13/04* (2006.01)
*H04N 13/305* (2018.01)

(52) U.S. Cl.
CPC ..... *H04N 13/305* (2018.05); *H04N 2213/001* (2013.01)

(58) Field of Classification Search
CPC .................................................. H04N 13/0404
See application file for complete search history.

(56) References Cited

U.S. PATENT DOCUMENTS

| 2004/0033051 A1* | 2/2004 | Ip | H04N 5/913 386/254 |
| 2005/0127820 A1* | 6/2005 | Yamazaki | H01L 51/5281 313/501 |
| 2009/0244711 A1* | 10/2009 | Yokoyama | G02B 5/26 359/613 |
| 2016/0097971 A1* | 4/2016 | Horikoshi | A63J 5/021 353/8 |

FOREIGN PATENT DOCUMENTS

| KR | 10-2014-0071281 B1 | 10/2014 |
| KR | 10-2014-0130077 A | 4/2016 |

* cited by examiner

*Primary Examiner* — Tracy Y Li
(74) *Attorney, Agent, or Firm* — Bacon & Thomas, PLLC

(57) ABSTRACT

A transparent LED display device structure having an image tape formed having a small width by a thin plate and in which an image is formed by the unit of a line in a horizontal direction; an image division structure provided below an image plate line, in which oblique surfaces formed by a first prism bar and a second prism bar having a reflection surface as a rectangular oblique side are coupled with each other, and as a result, a front image and a rear image straightly penetrate and light of the image tape, which vertically incidents in the oblique surface is reflected at a right angle at 90°; a blocking plate provided on the bottom of the image division structure; and a transparent image plate configured by sequentially stacking the blocking plate, the first and second prism bars, and the image tape upwards.

4 Claims, 14 Drawing Sheets

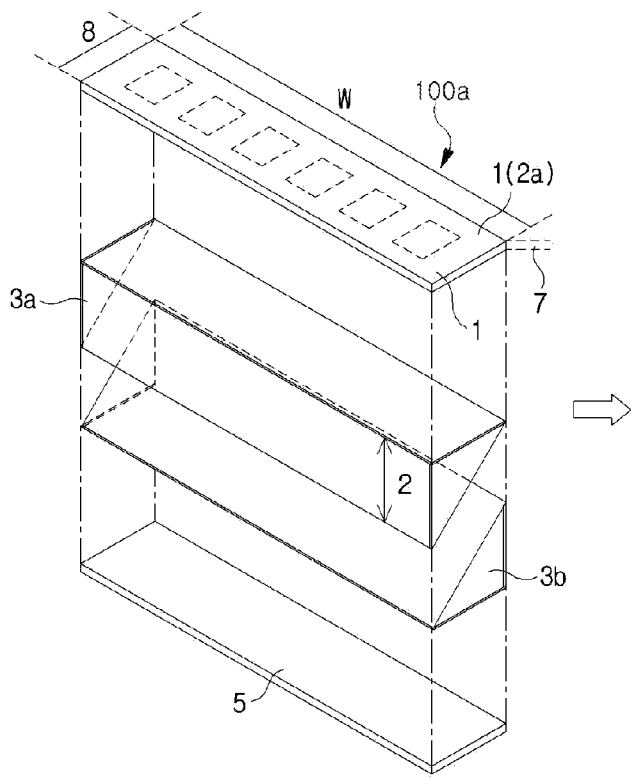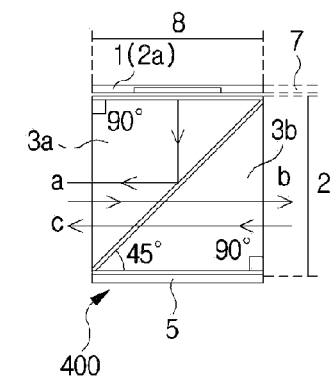
FIG. 6A                    FIG. 6B

Fig. 8

| | A | | B | | C | | D | |
|---|---|---|---|---|---|---|---|---|
| 1R | 1L | 2R | 2L | 3R | 3L | 4R | 4L |
| 5R | 5L | 6R | 6L | 7R | 7L | 8R | 8L |
| 9R | 9L | 10R | 10L | 11R | 11L | 12R | 12L |
| 13R | 13L | 14R | 14L | 15R | 15L | 16R | 16L |
| 17R | 17L | 18R | 18L | 19R | 19L | 20R | 20L |
| 21R | 21L | 22R | 22L | 23R | 23L | 24R | 24L |
| 25R | 25L | 26R | 26L | 27R | 27L | 28R | 28L |
| 29R | 29L | 30R | 30L | 31R | 31L | 32R | 32L |

~200

A
| 1R | 1L |
| 5R | 5L |
| 9R | 9L |
| 13R | 13L |
| 17R | 17L |
| 21R | 21L |
| 25R | 25L |
| 29R | 29L |

2b

B
| 2R | 2L |
| 6R | 6L |
| 10R | 10L |
| 14R | 14L |
| 18R | 18L |
| 22R | 22L |
| 26R | 26L |
| 30R | 30L |

2b

C
| 3R | 3L |
| 7R | 7L |
| 11R | 11L |
| 15R | 15L |
| 19R | 19L |
| 23R | 23L |
| 27R | 27L |
| 31R | 31L |

2b

D
| 4R | 4L |
| 8R | 8L |
| 12R | 12L |
| 16R | 16L |
| 20R | 20L |
| 24R | 24L |
| 28R | 28L |
| 32R | 32L |

2b (Conventional LED Display Structure)

TRANSPARENT LED DISPLAY DEVICE

CROSS-REFERENCE TO RELATED APPLICATION

This application claims under 35 U.S.C. § 119(a) the benefit of Korean Patent Application No. 10-2016-0090619 filed on Jul. 18, 2016 the entire contents of which are incorporated herein by reference.

BACKGROUND OF THE INVENTION

The present invention relates to a transparent LED display device, and more particularly, to device capable of viewing an external foreground of a rear surface on a front surface of a transparent image plate and an external foreground of the front surface of a transparent image plate on the rear surface of the transparent image plate while viewing a high-brightness image or an autostereoscopic image in a transparent structure such as a transparent window by a viewer.

Generally, a clear image condition is possible when the brightness of an image itself is twice more than the ambient brightness.

An image device which views the image by a transparent plate structure by deleting a rear backlight structure of an LCD or an OLED is known. However, since such an image needs to use ambient light, it is impossible to view the image in a dark place and the brightness itself is dark even though the image device has a self light emitting function.

That is, transmittance is as low as 5 to 15%, so transparency is lowered, and the brightness is usually as low as 200 to 300 $cd/m^2$ even though a backlight is used.

On the other hand, the ambient light of an exhibition place or a business place where such an image device is installed is usually about 1,000 lux (330 $cd/m^2$), so that the image is relatively dark.

In addition, an LED display device as a light emitting diode emits red, green, and yellow light when current flows in a semiconductor made of Ga (gallium), P (phosphorus), and AS (arsenic) and the brightness reaches a maximum of 1,000 $cd/m^2$ or more when the LED display device is used as an image pixel.

Such a light emitting diode module may be configured in a structure in which a light emitting area is large, while a thickness is small.

In the case of the structure of a modular electric signboard in Korean Patent Application No. 10-2014-013077, a technique that can view an exterior through a gap of the LED modules spaced apart from each other inside is known.

In the case of a spectacle 3D LED structure in Korean Patent Application No. 10-2014-0071281, a plurality of LEDs are arranged in line and neighboring strip substrates are arranged with an image separation distance so as to see background behind the image separation distances.

However, the display device structure is used as a light source in the related art, but in order to simultaneously observe the rear background as shown in FIG. 14(a), an image separation distances D1 between LED plates D1 is at least 1:2 to 1:20, the image is not properly formed, the image is rough, and when the LED plate D1 is not in use, the LED plate D1 itself has become a hindrance to practical use due to the refusal such as obscuring the field of view.

Prior Art Document

[Patent Document 1] KR 10-2014-013077.
[Patent Document 2] KR 10-2014-0071281.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is contrive to solve the above problems and has been made in an effort to propose a transparent LED display device that uses an image source that autonomously emits light, such as an LED display, an LCD, and an OLED image as a video means in a transparent image device such as glass, but is utilized in the form of a transparent window when there is no image and minimizes an image separation distance between images of pixels of each image to be minimized from 1:0.1 to 1:2 so as to provide accurate and bright image and brightness up to 200 times when the image is displayed, and is capable of viewing a rear background on a front surface and a front background on a rear surface together with the image.

As presented in the drawing, according to the present invention, a transparent LED display device includes:

an image tape 1 formed in a tape shape by a thin plate and formed by a stereoscopic left-eye image R and a stereoscopic right-eye image L;

left and right lenticulars 6a and 6b provided on front surfaces of the left and right-eye image tapes 1, respectively;

an image line 100a configured by one line with an image division means 400 which is provided on the front surfaces of the left and right lenticulars 6a and 6b, which a front image and a rear image straightly penetrates, and which perpendicularly reflects the left and right-eye images R and L of the image tape 1 at 90°; and an autostereoscopic display plate 101 configured by sequentially stacking the image line 100a, wherein at the time of providing the autostereoscopic image, a high-definition autostereoscopic image is provided to the outside of the transparent image plate 100 and views through the outside in the structure, and at the time of not providing the image, the LED display device serves as an autostereoscopic transparent image plate 101 in both the inside and the outside, such as glass.

In the configuration of the transparent image plate 100 and the autostereoscopic image plate 101, a structure of an image tape 1 is configured by an image structure which autonomously emits the image. The image division means 400 is configured by coupling an oblique surface of a first prism bar 3a structure and the oblique surface of a second prism bar 3b structure with each other or a semi-transparent mirror in which a ratio of reflectance to transmittance becomes 2:8 to 8:2 at an inclination angle of 45° is substitutively configured by an image division plate 4.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 6A and B are diagrams illustrating a configuration of an image line configured by a prism bar;

FIG. 8 is a diagram illustrating a process of separating an autostereoscopic image from an image line;

Figure 1A:
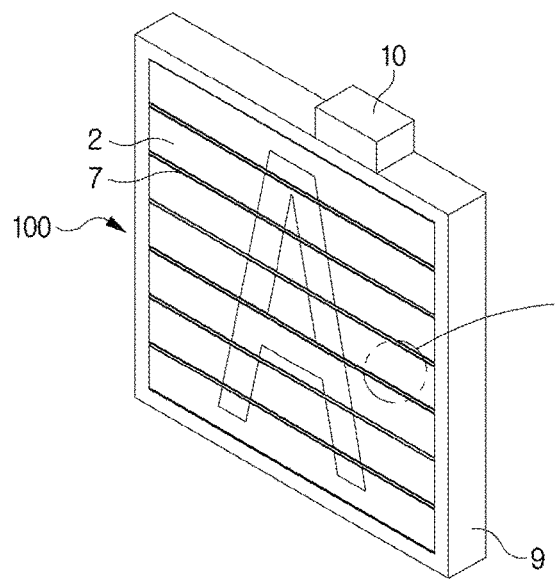
FIG. 1A illustrates a configuration embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, reference will now be made in detail to various embodiments of the present disclosure, examples of which are illustrated in the accompanying drawings and described below.

The present invention provides a transparent LED display device including: an image tape 1 having a shape such as a thin-film tape;

an image division means 400 which straightly incident external light penetrates and reflects an perpendicularly incident image to the outside; and a blocking plate 5 formed by a matte black surface and configured to block each image by the unit of an image, wherein the structure is constituted by image line plates 100a coupled in one bar shape, and a transparent image plate 100 by sequentially stacking the image line plates 100a, at the time of providing the image, a high-definition image is provided to the outside of the transparent image plate 100 and views through the outside in the structure, and at the time of not providing the image, the LED display device serves as the transparent image plate 100 in both the inside and the outside, such as glass.

Terms or words used in the present specification and claims, which will be described below should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

The configurations illustrated in embodiments and the drawings described in the present specification are just preferable examples of the present invention and the technical spirit of the present invention is not limited thereto, and may include various equivalents and modifications capable of replacing the configurations.

Referring to FIG. 1A, the present invention includes an image control box 10 configured by a plurality of CPUs and an image division means 400 which is made of a transparent material such as glass, polycarbonate, PC, or acrylic in the frame 9 in a horizontal or vertical direction so that an external foreground of the rear surface is transparent on the front surface and an external foreground of the front surface is transparent on the rear surface.

Figure 1B:
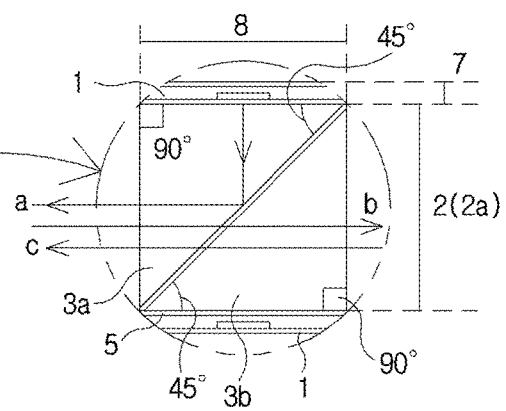
FIG. 1B is an enlarged diagram illustrating a horizontal image tape.

In detail, the image division means 400 is configured by the transparent image plate 100, configured by a first prism bar 3a and a second prism bar 3b as illustrated in FIG. 1B, in which prism bars have two vertical angles of 45° and the remaining central vertical angles of 90° and oblique sides of the first and second prism bars 3a and 3b are combined to be in contact with each other and thus, the overall shape is a bar shape.

Figures 7A, 7B:
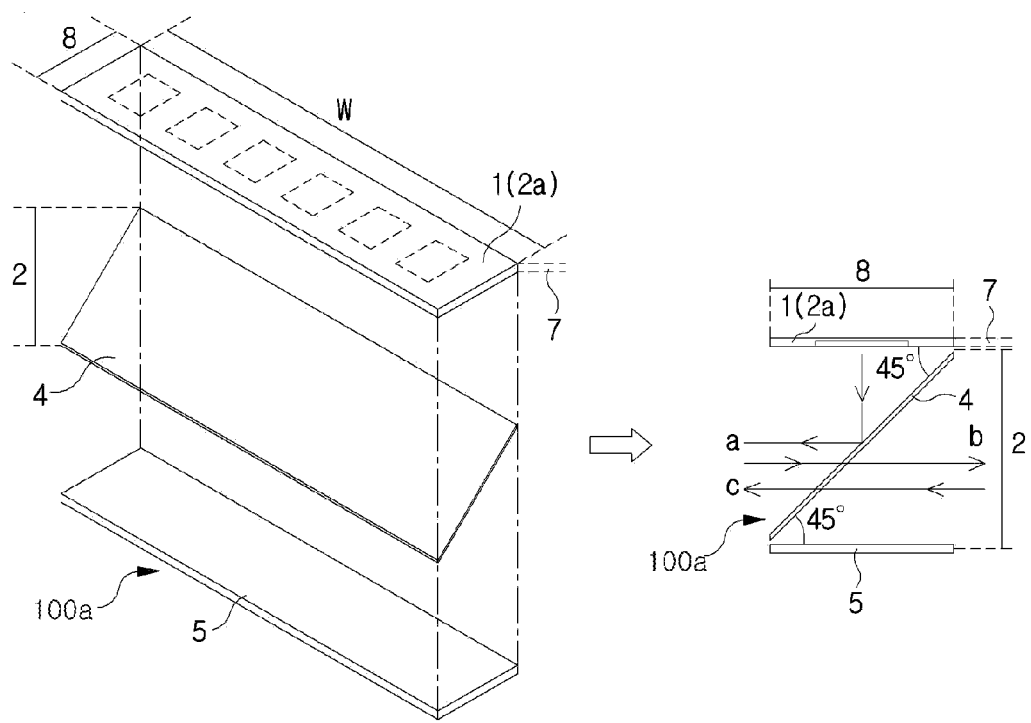
FIGS. 7A and B are diagrams illustrating a configuration of an image line configured by an image division plate.

In such a configuration, as illustrated in FIGS. 1B, 6B, and 7B, light incident from the top of the first prism bar 3a is reflected at a right angle of 90° from the oblique side where the first and second prisms 3a and 3b contact each other, light of the external foreground c directly incident on the front surface of the first prism bar 3A is directly transmitted through the oblique side of the second prism bar 3b and the light of the external foreground b incident directly on the rear surface directly transmits the first prism bar 3a.

That is, the structure of the prism bar 3 has a light division function in which the amount of the light incident to the front and rear surfaces is transmitted at a ratio of 5:5 and the remaining amount thereof is refracted and reflected at a right angle of 90°.

The image division means 400 having the light division function transmits or reflected and refracted a clear image because the first and second prism bars 3a and 3b themselves are made of transparent single materials having no foreign substance such as glass, polycarbonate, acrylic, and pc.

Figure 2:
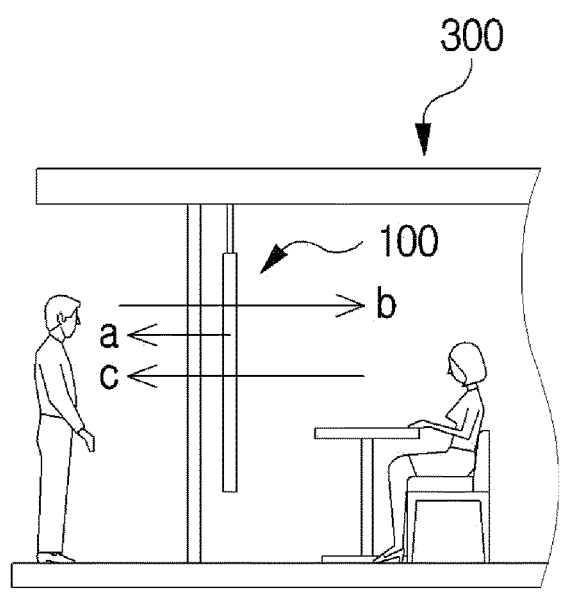
FIG. 2 is an diagram illustrating a use example 1 of the present invention.

Accordingly, when the present invention is installed in a store window, as illustrated in FIG. 2, an external user may simultaneously observe an image a of the transparent image plate 100 and the foreground b of the inside of the shop at the rear surface of the transparent image plate 100 and a customer inside the shop may simultaneously observe an image a of the transparent image plate 100 and an external foreground of the front surface of the transparent image plate 100.

Figure 3:
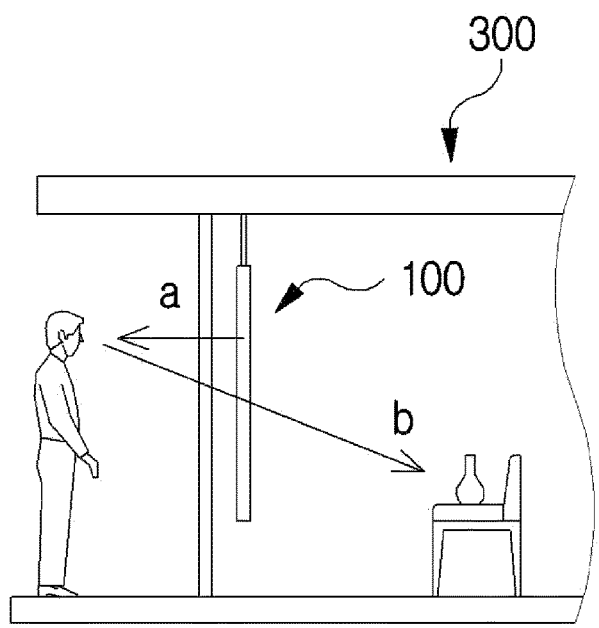
FIG. 3 is an diagram illustrating a use example 2 of the present invention.

Further, as illustrated in FIG. 3, the external user may simultaneously observe the image a of the transparent image plate 100 and a product displayed on the rear surface of the transparent image plate 100, and when the image is not displayed, the image is seen as a transparent glass window itself.

Figure 4:
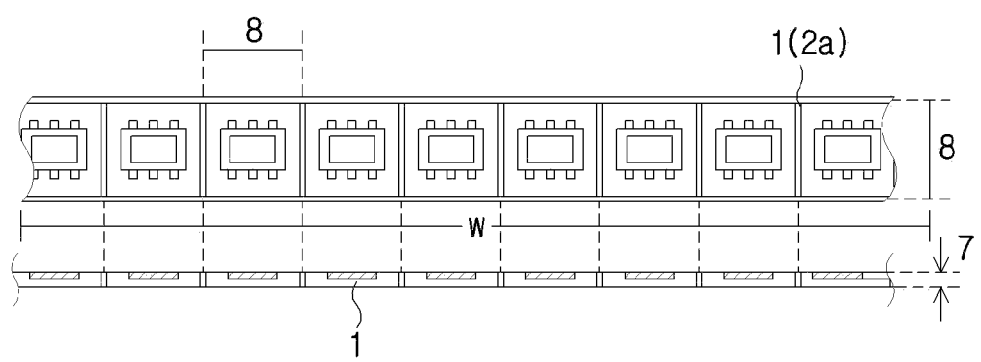
FIG. 4 is a diagram illustrating an image tape.

As illustrated in FIG. 4, a structure of the image tape 1 is formed by a thin plate with a narrow width and the LED is configured in a tap form of multiple layers.

Figure 5:
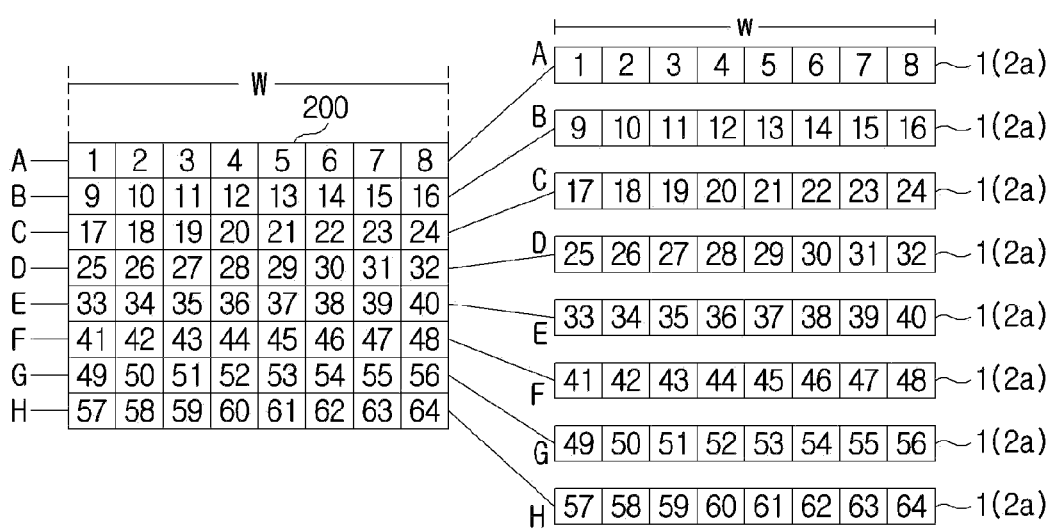
FIG. 5 is a diagram illustrating a configuration of an image tape.

As illustrated in FIG. 5, the entire image 200 of the LED display is configured by the image tape 1 illustrated in FIGS. 1B, 6B, and 7B by sequentially lining and then separating images of image numbers 1 to 8 in a line A and images of image numbers of 6 to 10 to a B line for convenience of description.

The image control box 10 of FIG. 1 controls the image since the image tape 1 is formed of a thin film plate with a narrow width as illustrated in FIG. 4, a connector is formed on the front surface of both ends, a plurality of CPUs is formed to be transmitted as serial signals, and a sub-board connector is connected to the image control box 10 on the upper or lower part of the front surface.

In the image tape 1, as illustrated in FIG. 4, a difference between a size 8 and a thickness 7 of the image plate having a light emitting surface is very large. In the LED, for example, when the size of the image plate 8 is 8 mm×8 mm, the thickness 7 of the image plate becomes 1 mm and a horizontal length w depends on a screen size.

An embodiment of the present invention is as follows according to FIGS. 6A and 6B and FIGS. 7A and 7B.

A size of a 100" screen of which a ratio of a vertical screen to a horizontal screen is 16:9 becomes width of 2,214 mm×length of 1,246 mm.

That is, the thickness 7 of the image tape 1 is 1 mm, the width 8 is 3 mm, and the length w is 2,214 mm.

Cross-sectional sizes of the first and second prism bars 3a and 3b of the image division means 400 have a right angle prism of which two sides are 3 mm and a length of 2,214 mm.

The thickness of the blocking plate 5 is 0.5 mm, the width is 3 mm, and the length is 2,214 mm.

The first and second prism bars 3a and 3b are coupled to each other by contacting the oblique sides and thus an appearance becomes a square bar of which each side is 3 mm.

The 3 mm width of the image tape 1 is coupled to one surface of the 3 mm width of the first prism 3a and the blocking plate 5 is coupled to the one surface of the 3 mm width of the second prism 3b.

A total thickness per unit of the image line plate 1 coupled as such is 4.5 mm in which the thickness of the image tape 1 is 1 mm+, the thickness of the first and second prime bars 3a and 3b is 3 mm+, and the thickness of the blocking plate 5 is 0.5 mm, the thickness thereof 3 mm, and the length is 2,214 mm.

As illustrated in FIG. 5, when the vertical width w of the image is 100", 1,246 mm are divided into a width of 3 mm to be about 415 lines.

That is, the size of the image line plate 100a in which the image tape 1, the first and second prism bars 3a and 3b, and the blocking plate 5 are coupled to each other in one bar becomes a thickness of 4.5 mm, a length of 1,246 mm, and a width of 3 mm.

When such an image line plate 100a is sequentially stacked with 415 lines, the image line plate 100a becomes 100" transparent LED display device 100 as illustrated in FIG. 1A.

The image structure of the present invention is vertically stacked in left and right directions with the same logic as described above.

Further, the configuration of the image line plate 100a of FIG. 7 is differently configured by only a semitransparent-mirror structural image division plate 4 instead of the first and second prism bars 3a and 3b and thus, applied as the same logic.

In the image tape 1 formed above, as illustrated in FIGS. 6A and 6B, the light source is configured to be irradiated in a lower direction and coupled with the upper surface of the first prism bar 3a at the lower portion, the oblique side of the first prism bar 3a is formed in an inner downward direction, and then coupled and closely contacted with oblique side of the second prism bar 3b at the same oblique angle as the oblique side of the first prism bar 3a, and the lower surface of the second prism bar 3b is connected to the blocking plate 5.

The configuration of FIGS. 7A and 7B is substitutively configured by the image division plate 4 in which some of the light incident at an inclination angle of 45° is transmitted and some thereof is reflected instead of the first and second prism bars 3a and 3b, and the image division plate 4 is different and all of the operation and configuration logic are the same as the logic of FIGS. 6A and 6B.

That is, the image division plate 4 is configured by a structure having a semitransparent mirror function in which some of the incident light is transmitted and some is reflected of the oblique side made of the transparent material such as glass. Since the reflectance and the transmittance are inversely proportional, a ratio of the reflectance and the transmittance is 2:8 to 8:2, and the reflectance and the transmittance are used according to the use of the installation site.

That is, in the image division structure by coupling of the first and second prism bars 3a and 3b, the reflectance and the transmittance are fixed to 5:5.

When the present invention is installed and used outdoors, the higher the reflectance of the image, the better the image should be bright. In this case, the reflectance and the transmittance are recommended to be 8:2, 5:5 in the bright room and 2:8 in the dark room.

The surface of the blocking plate 5 is formed of a black matte surface and thus, the amount of light transmitted through the image division means 400 configured by the prism or the light dividing plate is reflected back to prevent the contrast of the image from being deteriorated.

Such a configuration is provided in an inner structure of a frame 9 of FIG. 1A and configured by vertically stacking the blocking plate 5 from the bottom of the frame 9, the second prism bar 3b thereon, the first prism bar 3a thereon, and the image tape 1 on the upper end in sequence.

Even if the order is vertically stacked in a downward sequential manner, the effect is the same.

In addition, the vertical image line 2b may be horizontally arranged and the image may be adjusted to a horizontal image through the image control box 10.

In the present invention, as illustrated in FIG. 6B, the light source of the image tape 1 is perpendicularly refracted at 90° from the oblique side of the first and second prism bars 3a and 3b and directly reflected to the outside. As illustrated in FIG. 2, the foreground in the store and the image a of the transparent image plate 100 may be simultaneously viewed through the transparent image plate 100 at the outside of the store, and as illustrated in FIG. 3, the image a and the foreground in the store such as products displayed on the rear surface may be simultaneously observed through the transparent image plate 100.

Further, by the above configuration, when a backlight source of the LCD or the OLED is the LED, the image may be provided as bright light of about 1,000 cd/m².

FIG. 8 illustrates a diagram in which in order to view a stereoscopic image glassless through the transparent image plate, the structure of the image tape 1 is vertically configured and a left-eye image 1L LED and a right-eye image 1R LED for the stereoscopic image are configured in one vertical line.

That is, as illustrated in FIG. 8B, a vertical image line 2b is formed by a thin film plate with a narrow width, the connectors are formed on the front of the ends, a plurality of CPUs are formed so as to transmit serial signals, and the A lines are vertically arranged in the order of 1R and 1L and 5R and 5L therebelow, the B lines are vertically arranged in the order of 2R and 2L and 6R and 6L therebelow, thereby separating the entire image 200 in the vertical direction to form the vertical image line 2b.

Figure 9:
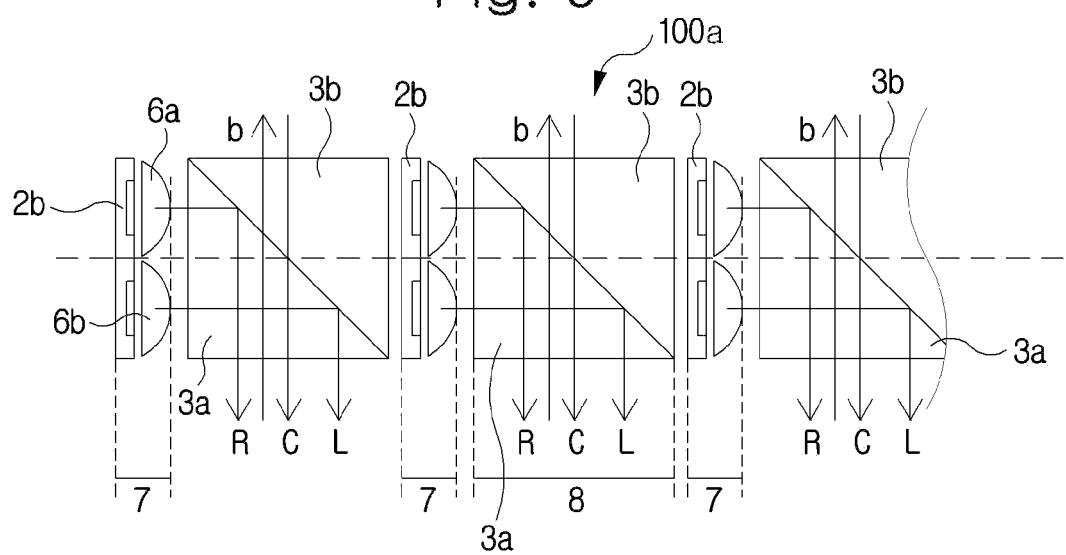
FIG. 9 is a diagram illustrating a configuration of an image line in which an autostereoscopic image is configured by a prism bar.

As illustrated in FIG. 9, the vertical image line 2b is disposed in a depth direction of vertical, horizontal, and depth direction of the transparent image plate 100, lenticulars 6a and 6b are formed on the entire surface thereof, and the first prism bar 3a and the second prism bar 3b are formed on the entire surfaces of the lenticulars 6a and 6b.

Figure 13:
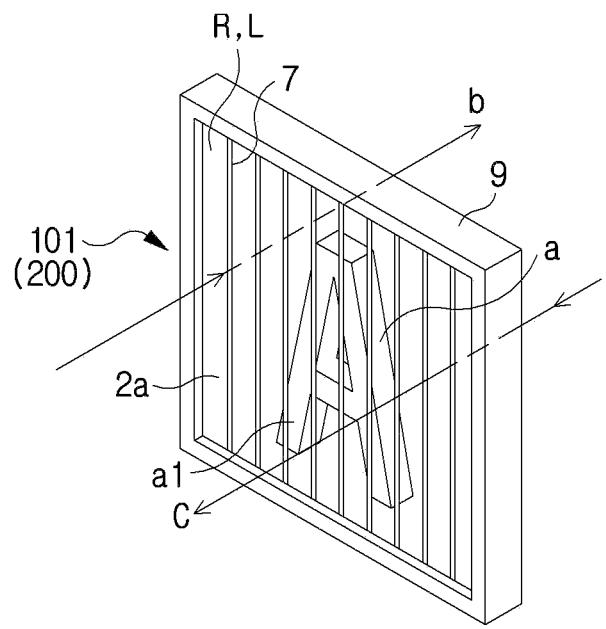
FIG. 13 is a diagram illustrating a structure of a transparent image plate configured by the autostereoscopic image structure.

The configurations are sequentially disposed in the horizontal direction in the frame 9 as illustrated in FIG. 13.

That is, the vertical image line 2b is vertically disposed in the frame 9 so that only the thickness 7 is visible on the entire surface, and the left and right lenticulars 6a and 6b on the front surface thereof are sequentially configured at left to right or right to left side by engaging with the oblique sides of the first prism bar 3a and the second prism bar 3b on the front surface thereof.

In the structure of the present invention, as illustrated in FIG. 9, since the stereoscopic image of the vertical image line 2b enlarged by the left and right lenticulars 6a and 6b is refracted at 90° at the oblique surface of the first prism bar 3a and then reflected to the entire surface and the external foreground and the internal foreground directly incident are directly transmitted, while the stereoscopic image is observed glassless, the internal foreground b of the rear surface may be simultaneously viewed at the outside and the external foreground may be simultaneously viewed through the transparent image plate 100 at the inside.

Figure 10:
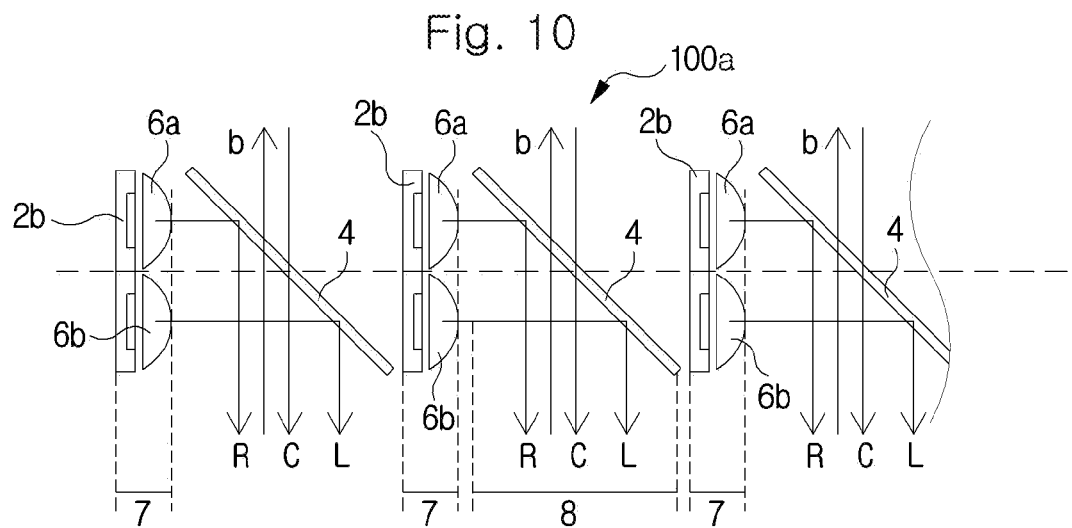
FIG. 10 is a diagram illustrating a configuration of an image line in which an autostereoscopic image is configured by an image division plate.

FIG. 10 is the same logic as the structure of FIG. 9, but instead of the first and second prism bars 3a and 3b, the image division plate 4 in which some is reflected and some is transmitted and a ratio of the reflectance and the transmittance is configured to 2:8 to 8:2 is replaced.

Figure 11:
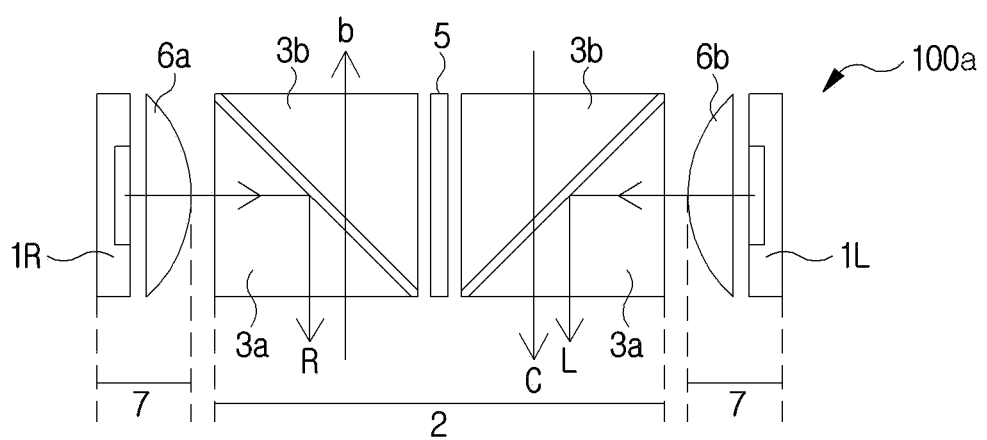
FIG. 11 is a diagram illustrating a configuration of an image line in which an autostereoscopic image is configured by a prism bar.
Figure 12:
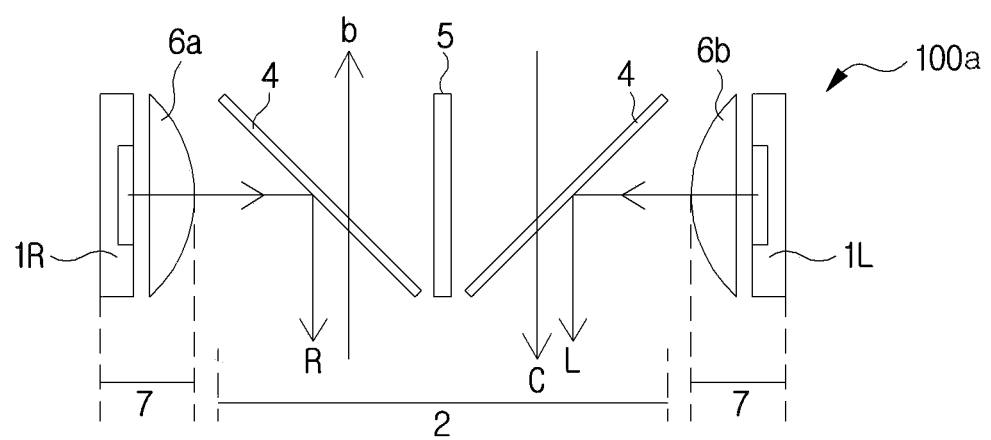
FIG. 12 is a diagram illustrating a configuration of an image line in which an autostereoscopic image is configured by a image division plate.

In such a structure, as illustrated in FIGS. 11 and 12, the left-eye and right-eye LEDs 1R and 1L for the stereoscopic image of the vertical image line 2b of FIG. 8 are separated from each other to configure one image structure as left and right symmetry structures and the blocking plate 5 is configured at the center and the left-eye and right-eye LEDs are configured sequentially in a left-right direction or a right-left direction by one unit.

FIG. 12 uses the first and second prism bars 3a and 3b as the image dividing device and FIG. 12 is the same as FIG. 11 except for using the image division plate 4.

Accordingly, in the structure, as illustrated in FIGS. 2A, 2B, 9 and 10, a person on the front surface of the transparent image plate may observe simultaneously the autostereoscopic image and the internal foreground b on the rear surface of the transparent image plate 100 through the transparent image plate 100 and a person on the rear surface of the transparent image plate may observe simultaneously the image of the transparent image plate 100 and the external foreground c of the front surface.

Further, the structure of the present invention may be applied to all of the image tapes 1 in which the LCD or the OLED combined with the a light source or the entire image may be configured in a tape form as the same logic and applied to all configurations of FIGS. 1 to 13.

The operation structures of the first and second prism bars 3a and 3b and the image division plate 4 described above are all commonly applied to the embodiments of the present invention.

In addition, the backlight structure of the background of the conventional transparent LCD and OLED may be used by combining the image division means 400 having the light dividing function, which is the structure of the present invention, and the LED as a light source.

In this case, the image tape 1 of the LCD and the OLED may be configured on the surface of the transparent image plate 100 on the front surface of the first and second prism bars 3a and 3b and the image division plate 4 illustrated in FIG. 7B.

Further, when the structure of the prism bar 3 of the image division means 400 and the structure of the image division plate 4 may change the image viewing direction from the outside to the inside by reversing the reflection direction of the image when the direction of the slopes is reversed.

Since the structure of the present invention is advantageous in that LED having high luminous intensity may be used as a light source as it is, it is possible to provide images with brightness of 4 times or more luminance of 1,000 cd/m² as compared to the brightness of 250 cd/m² of the conventional LCD and OLED.

Accordingly, the present invention is configured by the image tape 1 formed by a narrow thin plate with a narrow width as illustrated in FIGS. 4 and 5 like a LED, an LCD, and an OLED, and the image is formed in a horizontal or vertical line unit.

As illustrated in FIGS. 6A and 6B, the present invention is configured by the image division plate 400 which is provided at the bottom of the image plate line 1 and in which the internal image and the external image in which oblique surfaces formed by the first prism bar 3a and the second prism bar 3b having a reflection surface as a quadrangular oblique side are connected to each other and directly transmitted are directly transmitted and the light of the image tape 1 incident vertically to the oblique surface is reflected at a right angle of 90°.

The blocking plate 5, the first and second prism bars 3a and 3b and the video tape 1 are sequentially stacked vertically on the lower surface of the image division means 400 as illustrated in FIG. 1A in an upward or downward direction to constitute a transparent image plate 100.

The structure of the image tape 1 may be substitutively configured by the LCD or the OLED.

The structure of the image division means 400 may be substitutively configured by the image division plate 4 in which 50% is transmitted and 50% is reflected at an inclined angle of 45° as illustrated in FIGS. 7A, 7B, 10, and 12.

The autostereoscopic structure is formed by a thin film plate with a narrow width as illustrated in FIG. 8 and includes the vertical image tape 2b in which the left-eye image R and the right-eye image L are formed in a vertical line and left and right lenticulars 6a and 6b configured on the front surfaces of the left-eye and right-eye images R and L as illustrated in FIG. 9.

The internal image and the external image in which oblique surfaces formed by the first prism bar 3a and the second prism bar 3b having a reflection surface as an oblique side are connected to each other on the front surfaces of the left and right lenticulars 6a and 6b are directly transmitted and the light of the image tape 1 incident horizontally to the oblique surface is reflected at a right angle of 90°.

As illustrated in FIG. 13, the image tape 1, the left and right lenticulars 6a and 6b, and the image providing means 400 are sequentially directly connected to each other in one direction of left and right directions to configure a glassless transparent stereoscopic image plate 101.

Accordingly, the autostereoscopic image structure may apply the horizontal image tape 2a and in this case, the images need to be adjusted from a horizontal arrangement to a vertical arrangement through the image control box.

The reason for the horizontal configuration is that the human's eyes detecting the stereoscopic effect are formed in the horizontal direction.

Accordingly, the component of the image tape 1 of the present invention may use all image devices in which LCDs, LEDs, micro LEDs, and OLEDs emit the image itself or the image itself becomes a light emitting source by combining with the light source.

As illustrated in FIGS. 10 and 12, the structure of the image division means 400 may be substitutively configured by the image division plate 4 in which some is transmitted based on 50% at an inclined angle of 45° and some is reflected according to a used place.

That is, a ratio of the reflectance to the transmittance may be used to 2:8 to 8:2.

Figure 14A:
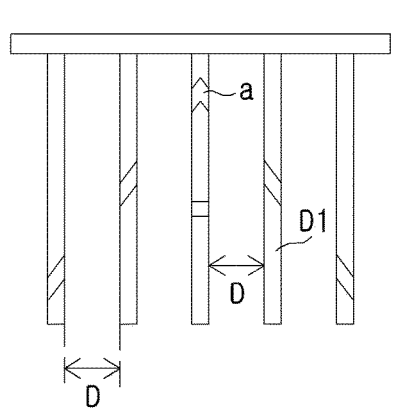
FIGS. 14A and B are comparative diagrams of a LED display structure in the related art and the present invention.
Figure 14B:
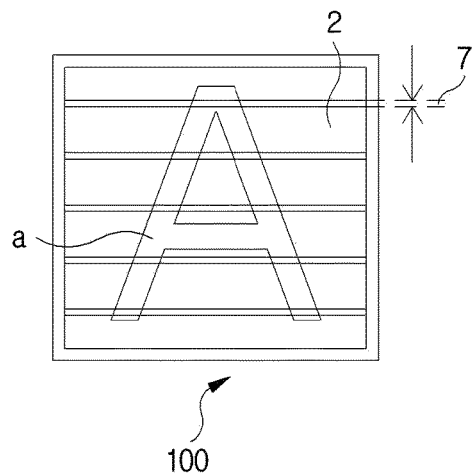

Accordingly, as illustrated in FIG. 14, in the prior art, an image separation distance D between the LED plates D is 1:2 to 1:20 for simultaneously observing a rear background by using a LED display structure and thus, the images are not properly formed.

The present invention provides high resolution from twice to 200 times because the image separation distance D is configured from 1:0.1 to 1:1 and the LED plate D itself may not be practical due to a rejection feeling such as blocking visibility without use. However, in the present invention, a vision is not covered by the transparent plate such as glass without using and when the image is implemented, the outside at the inside and the inside at the outside can simultaneously view the image and the autostereoscopic image. Since the image separation distance D is enlarged from twice to 200 times, the brightness may be enlarged from twice to 200 times. Accordingly, the present invention can be used for various purposes such as transparent image displays of various sizes and uses, images of an office, windows, games, store windows, advertising devices, and image glass partitions of a restaurant.

The present invention serves to be transparent like a general window at the time of not providing an image and provides a bright and clear image under a bright light at the time of providing the image.

Further, the present invention serves to be transparent like the general window at the time of not providing the image even when an autostereoscopic image and provides a bright and clear stereoscopic image in an autostereoscopic manner even under the bright light at the time of providing a stereoscopic image.

Since a transparent image plate of the present invention has transmittance and reflectance of about 5:5 or 8:2 to 2:8, which do not contain foreign substances, the foreign substance such as a liquid crystal in the related art is inserted to observe a very clear rear or front view with transmittance of 2 to 4 times as compared with an image of an LCD or OLED having low transmittance and even as an image of a transparent image plate, an image is provided, which has a brightness to be viewed even under the sunlight by using an image as a self-emitting light source like an LED.

Further, since an image separation spacing between the images is provided in an almost dense state, the image is provided with a high resolution of a maximum of 200 times as compared with the related art.

An external front view of the rear surface of the transparent image plate is observed on the front surface of the transparent image plate and the external front view on the front surface of the transparent image plate is observed on the rear surface of the transparent image plate simultaneously with the image.

Accordingly, an image source that autonomously emits light, such as an LED display, an LCD, and an OLED image is used as a video means in a transparent image device such as glass, but is utilized in the form of a transparent window when there is no image and an image separation distance between images of pixels of each image is minimized to be minimized from 1:0.1 to 1:2 so as to provide accurate and bright image and brightness up to 200 times when the image is displayed, and a rear background can be viewed on a front surface and a front background can be viewed on a rear surface together with the image.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

EXPLANATION OF REFERENCE NUMERALS

1: Image tape, 2: Horizontal image line, 2a: Horizontal image line, 2b: Vertical image line
3: Prism image bar, 3a: First prism bar, 3b: Second prism bar
4: Image division plate, 5: Blocking plate
6a: First lenticular line, 6b: Second lenticular line
7: Thickness of image plate, 8: Size of image plate
9: Frame, 9a: Image, 9a: Stereoscopic image, 9b: Foreground of front surface, 9c: Foreground of rear surface
10: Image control box, 100: Transparent image plate, 100a: Image line
101: Autostereoscopic transparent image plate
200: Entire image, 300: Store window, 400: Image division means

What is claimed is:
1. A transparent LED display device comprising:
first and second prism bars in which a triangular prism structure having positive angles configured by 45 degrees and remaining positive angles configured by 90 degrees is configured in a bar shape in which a length is larger than a width;
an image segmentation means configured by combining oblique faces of the first and second prism bars;
an image tape in which an entire image of an image display having an image itself as a light emitting source is segmented into the same sizes as one surface of the image segmentation means;
and an image blocking plate formed by a matte black surface and configured with the same size as one surface of the image segmentation means, wherein the image tape is provided on one surface of the first prism bar, the image blocking plate is provided on one surface of the second prism bar, the image segmentation means, the image tape, and the image blocking plate are combined in one configuration unit to constitute an image line plate, wherein the image line plate is constituted by image line plates forming the entire image by lamination in one direction of upward, downward, left, and right directions, and the width of the image line plate to an image separation distance of each of the image line plates is configured as 1:0.1 or more and less than 1:2 so as to implement the image of the image plate with high resolution, and wherein the image of the image plate is driven, an image with the high resolution is viewed in an outside viewing direction and the outside is transparent in an inside viewing direction through the image plate, and when the image of the image plate is turned off, the image plate becomes a transparent plate in both the inside and outside viewing directions.

2. The transparent LED display device of claim 1, wherein a structure of the image segmentation means is configured to be substituted with an image segmentation plate in which a transmittance to reflectance ratio at an inclination angle of 45 degrees becomes 2:8 to 8:2 and configured so that some images are transmitted and others are reflected.

3. The transparent LED display device of claim 2, further comprising the image line plate being sequentially separated and configured to input left and right images for a 3D image and representing the images, wherein left and right lenticules are provided on front surfaces of the image line plate, respectively to represent the 3D image.

4. The transparent LED display device of claim 1, further comprising the image line plate being sequentially separated and configured to input left and right images for a 3D image and representing the images, wherein left and right lenticules are provided on front surfaces of the image line plate, respectively to represent the 3D image.

* * * * *